UNITED STATES PATENT OFFICE.

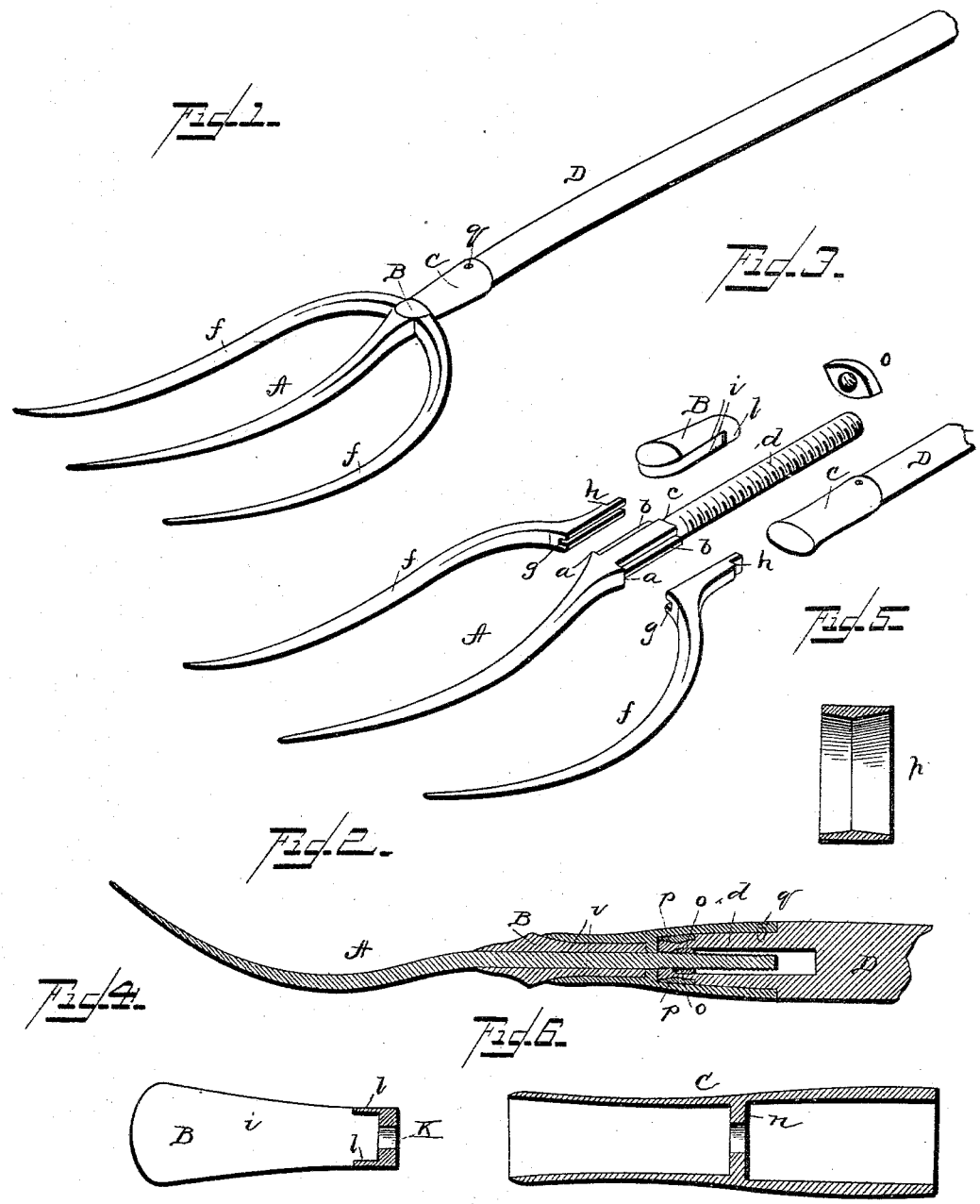

ANTON B. VAAG, OF HILLSBOROUGH, DAKOTA TERRITORY.

PITCHFORK.

SPECIFICATION forming part of Letters Patent No. 412,214, dated October 1, 1889.

Application filed August 17, 1889. Serial No. 321,083. (No model.)

*To all whom it may concern:*

Be it known that I, ANTON B. VAAG, a citizen of the United States, and a resident of Hillsborough, in the county of Traill and Territory of Dakota, have invented certain new and useful Improvements in Pitchforks; and I do hereby declare that the following is a full, clear, and exact description of the invention, which will enable others skilled in the art to which it appertains to make and use the same.

This invention relates to pitchforks, and has for its object to construct a device of this class which shall be simple and easy to be repaired in case of breakage, and which shall also be durable and efficient. I attain these objects by the device illustrated in accompanying drawings, in which—

Figure 1 is a perspective view of the fork attached to the handle. Fig. 2 shows a longitudinal section of the same. Fig. 3 shows the various parts detached. Fig. 4 represents a section of the shank attachment shown in Fig. 3. Fig. 5 shows a section of the narrow ferrule shown in Fig. 2; and Fig. 6 is a sectional view of the large ferrule shown in Figs. 1, 2, and 3.

Like letters of reference denote corresponding parts in all the figures.

Referring to the drawings, the letter A designates a fork having three detachable tines. The center tine is provided with a shoulder $a$, above which it is rectangular in shape, and has two laterally-projecting tongues $b$. A shoulder $c$ is formed at the upper termination of the rectangular portion and of the tongues $b$, and beyond this shoulder is the threaded prolongation $d$. Each of the side tines $f$ has its shank or upper extension provided with a groove $g$, adapted to register with the tongues $b$. The lower end of said shank rests against the shoulder $a$. The upper end of the shank portion of each of the side tines is provided with a shoulder $h$. When the side tines $f$ are placed in position, the shank attachment B is adapted to inclose the sides of the combined shanks of the three tines, which now form in effect a single shank. The shank attachment B presents on the inside two plain faces $i$. The upper end of the shank attachment is provided with a perforation K, through which the threaded prolongation $d$ of the center tine is adapted to pass, and has upon each side an integral plate $l$, adapted to receive the shank of the side tines above the shoulders $h$.

It will be observed by reference to Fig. 2 that the shank attachment B has each of its side pieces thickened near the lower end and tapered into lips. The ferrule C is provided with a centrally-perforated division $n$. This ferrule is circular at the upper end, but flattened and widened at the lower end, and is adapted to receive the shank attachment B after the tines have been properly placed in said shank attachment, and thus all the parts of the fork proper are held firmly in place. The prolongation $d$ of the center tine at the same time passes through the perforated division $n$, and is of such length as to extend a short distance above the ferrule.

The fork-handle D has inserted in its lower end a small nut $o$, and is provided with a narrow ring or ferrule $p$. This ferrule is thickened at its center, forming a bevel upon each side or toward each edge, as shown in Figs. 2 and 5. After the nut $o$ is inserted in the end of the fork stale or handle the ferrule is placed on the end of the handle, over the nut, and is wedged on. Thus it will be seen that the nut will be held firmly in the end of the handle. The ferrule $p$ is of such size as to fit the interior of the ferrule C, which receives the end of the fork-handle when the prolongation $d$ is screwed into the nut $o$ and into a longitudinal hole bored into the end of the handle.

The ferrule C and the fork are held in position on the handle and kept from turning by a small screw $q$ inserted through a perforation in said ferrule.

It will be seen that the fork may be removed from the handle by taking out the screw $q$ and turning out the fork, and that when one or more tines have been broken they can be replaced by new ones by an ordinary hand and without the necessity of employing a mechanic. It will also be seen that the various parts of my fork are so constructed as to combine strength, firmness, and durability.

It may be found in some cases that the shank and prolongation $d$ will hold the fork with sufficient firmness when driven or screwed into the handle without employing the nut o and ferrule p.

Having thus described my invention, I claim and desire to secure by Letters Patent of the United States—

1. The herein-described pitchfork, having detachable tines, the center tine having a shouldered and tongued shank and the side tines having grooves adapted to register with the tongues of the center tine, substantially as described.

2. The herein-described pitchfork, having detachable tines, the center tine being shouldered and tongued, the side tines being shouldered and grooved and having a shank attachment, substantially as and for the purpose shown.

3. The herein-described pitchfork, having detachable tines, the center tine being shouldered and tongued and the side tines being shouldered and grooved, having also a shank attachment and ferrule having a perforated division, constructed to co-operate substantially as described.

4. The herein-described pitchfork, having detachable tines, the center tine having a shouldered and tongued shank and a prolongation adapted to enter the handle, and the side tines being shouldered and grooved, also having a shank attachment, substantially as described, a divisioned ferrule, the lower part of which is adapted to receive the shanks and shank attachment and the upper division adapted to receive the handle, substantially as described.

5. The herein-described pitchfork, comprising the following elements: a center tine having a shouldered and tongued shank and an upward and threaded prolongation, side tines having shouldered and grooved shanks, a shank attachment, a ferrule having a division perforated to allow the insertion of the prolongation of the center-tine shank, and a nut adapted to be inserted in the end of the handle and receive the threaded prolongation of the shank, all constructed and combined to co-operate substantially as described.

6. The herein-described pitchfork, comprising the following elements: a center tine having a shouldered and tongued shank and a threaded prolongation, side tines having shouldered and grooved shanks, a shank attachment, a ferrule having a central division perforated to allow the insertion of the prolongation of the shank and having a small exterior perforation, a nut adapted to be inserted in the end of the handle and to receive the said prolongation, a narrow interiorly and centrally thickened ferrule adapted to be placed on the end of the handle to hold said nut and adapted to slide into the divisioned ferrule, and a screw adapted to be inserted through the exterior perforation of the divisioned ferrule into the handle, all constructed and combined to co-operate as and for the purpose set forth.

In testimony that I claim the foregoing as my own I have hereunto affixed my signature in presence of two witnesses.

ANTON B. VAAG.

Witnesses:
I. K. IVERSON,
JAMES E. HYDE.